United States Patent [19]
Wenzel

[11] 3,827,790
[45] Aug. 6, 1974

[54] SPECTACLE HOLDER
[75] Inventor: Ronald A. Wenzel, Norfolk, Mass.
[73] Assignee: The Hilsinger Corporation, Plainville, Mass.
[22] Filed: Apr. 26, 1973
[21] Appl. No.: 354,771

[52] U.S. Cl. ............................. 351/123, 24/129 W
[51] Int. Cl. ...................... G02c 5/00, F16g 11/14
[58] Field of Search ........... 351/118, 123, 155, 156, 351/157; 2/14 V; 24/129 W

[56] References Cited
UNITED STATES PATENTS
2,819,650  1/1958  Seron .................................. 351/156
3,450,467  6/1969  Phillips .......................... 351/156 X OTHER PUBLICATIONS
Optical J. & Review of Optom., Vol. XCV, Issue No. 11, p. 76, June 1958.

*Primary Examiner*—Paul A. Sacher
*Attorney, Agent, or Firm*—Barlow & Barlow

[57] ABSTRACT

A flexible member adapted to be attached to the ear engaging portions of the temples of a spectacle by means of elastic loops at the ends of the device with a means for adjusting the encircling size of the elastic loops.

4 Claims, 7 Drawing Figures

PATENTED AUG 6 1974　　　　　　　　　　　　　　　　　　　　3,827,790

SPECTACLE HOLDER

BACKGROUND OF THE INVENTION

Spectacles have been blown from the face of the wearer or dropped off of the face of the wearer when leaning over sometimes at locations where they are not retrievable. In order to retain the spectacles against loss some device has been utilized for attaching to the temples of the spectacles such for instance as shown in Hilsinger U.S. Pat. No. 2,835,945, May 27, 1958. This device depends upon the elasticity of an end loop of the flexible member which extends between the temples for securely gripping the temple, but there is no adjustment for the size of the end loop in case it is desirable to cause the loop to be smaller in order to provide the gripping desired. Also temples vary in size and the loop may be desired to be adjusted to the size of the end portion of the temple which is to be engaged. In Seron U.S. Pat. No. 2,819,650, Jan. 14, 1958, a solid band put on with tools, frictionally grips both lengths of a loop to bind them together and neither length may slide freely therethrough or serve as part of the attaching scheme.

SUMMARY OF THE INVENTION

In a device which is to extend between the two temples of a spectacle in order to prevent the spectacle from being detached from the body, elastic loops are located at the ends, which loops may be adjusted as to size so as to grip temples of varying dimensions and also to provide a rather simple means of assembly of the attachment of the device to the temples.

DESCRIPTION OF THE PREFERRED EMBODIMENT

Figure 1:
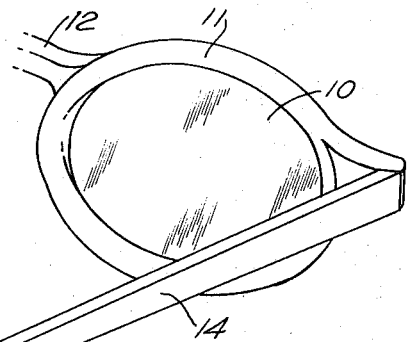
FIG. 1 is a perspective view showing a fragmental portion of a spectacle with a fragmental portion including an end of the device for holding the temples in place on the wearer and illustrating the adjustable means of this invention.

FIG. 1 shows a fragmental portion of a spectacle having a lens 10, rim 11 about the same and a portion of a bridge 12 to connect to a similar lens and rim. A temple 14 is hinged to the front of the spectacle and has a curved ear piece 15 at its end distant from the front to extend about the ear.

The device of this invention is the connection between the two temples of the spectacle and is designated generally 16.

Figure 3:
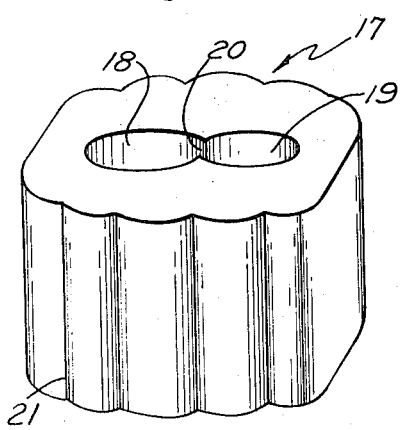
FIG. 3 is a perspective view of my adjustment member.

In the preferred form the adjustment member designated generally 17 comprises a block of plastic having the shape such as shown in FIG. 3 with holes 18 and 19 extending completely therethrough with a narrow slot 20 connecting these holes throughout their length. Some ornamentation such as a scalloping as shown at 21 may be provided on the outer surface of this block 17.

Figure 5:
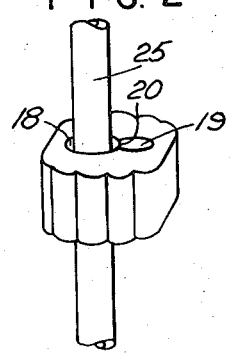
FIG. 5 is a perspective view illustrating the first step in securing the elastic cord to the adjustment member.
Figure 6:
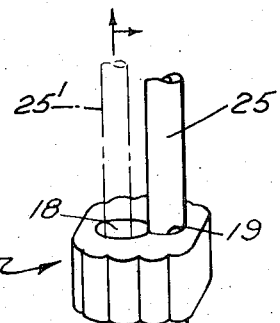
FIG. 6 is a perspective view illustrating the stretching of the elastic cord positioned in place in FIG. 5 and the moving it to the smaller opening of a size a little smaller than the diameter of the elastic cord.
Figure 4:
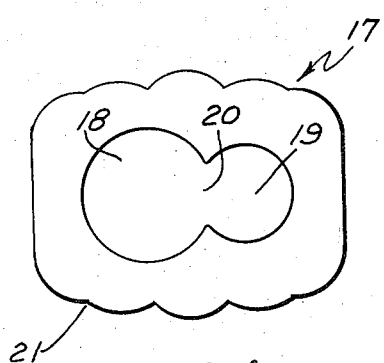
FIG. 4 is a top plan view thereof showing the relative sizes of the openings therethrough.

An elastic cord of generally round shape designated 25 in FIG. 5 has a size somewhat smaller in diameter than the diameter of the hole 18 through the adjustment member 17. In order to provide this cord 25 in loop form, this elastic cord 25 is passed through the hole 18 of larger size as shown in FIG. 5. This cord being elastic when stretched will cause its diameter to be reduced as shown in FIG. 6 at 25' and this cord in this stretched condition being of much less diameter than in its relaxed condition as shown in FIG. 5 is passed through the slot 20 between the openings 18 and 19, which slot is of a size to permit the cord 25 to be passed therethrough as shown in FIG. 6, that is from the dot dash line position to the full line position shown at FIG. 6 where it lodges in the opening 19. This opening 19 is of a diameter less than the diameter of the cord 25 when in relaxed condition. Thus the cord is frictionally gripped in the hole 19 but will permit the member 17 to be moved therealong.

Figure 2:
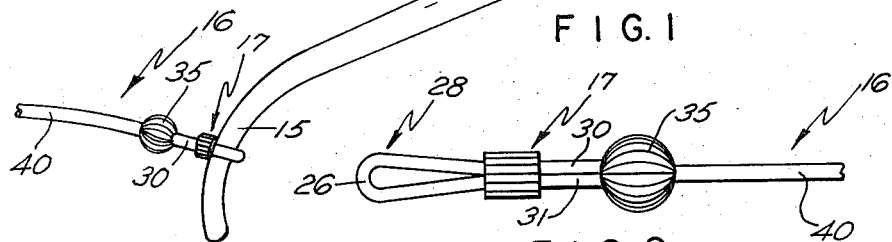
FIG. 2 is a fragmental plan view showing in greater detail the elastic loop and a fragmental portion that extends between the temples.
Figure 7:
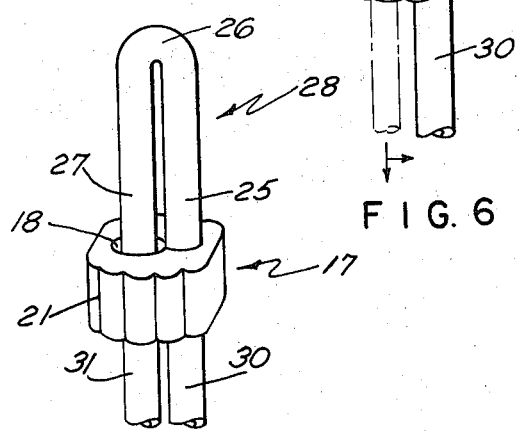
FIG. 7 is a perspective view illustrating a further step in positioning the elastic cord through the adjustment member.

One end, and here it is shown as the upper end, of the cord 25 is doubled upon itself providing a bight 26 and then the end portion 27 is passed down through the larger hole 18 as shown in FIG. 7 so as to provide a loop designated generally 28. The portions 30 and 31 of the elastic cord which are on the opposite side of the member 17 from the loop 26 are then secured together in any suitable manner such as by an ornamental device 35 as seen in FIG. 2 and as seen in FIG. 2 the loop portion 28 which extends on one side of the clamping member 35 has the adjustment device 17 movable between it and the loop 26 so as to vary the size of the loop 28 as may be desired. To grip the temple the elastic portion 28 is expanded and then put on the temple. The size of the loop is contracted to fit the temple as shown in FIG. 1 by sliding the adjustment member 17 close to the temple where it remains by the friction of cord 25 in opening 19.

It has been found that the block 17 may be ⅛ of an inch in the axial dimension of the holes, that the hole 18 which is the larger hole may be 90 thousandths in diameter, the hole 19 which is the hole of smaller diameter may be 65 or 66 thousandths in diameter while the dimension of the slot between the holes may be 37 thousandths of an inch. The general thickness of the stock about the hole 18 will be about 50 thousandths and the diameter of the elastic cord in a relaxed condition will be 70 thousandths. These sizes permit of a good working arrangement for adjustment of the loop and easy securing it on the temples of a spectacle.

The flexible portion 40 extending from the clamping member 35 may be the same piece as the portion 25 or a different piece of material.

I claim:

1. A spectacle holder comprising an elongated elastic member having an end portion with its end portion doubled upon itself to provide a loop having two portions, means to secure the end portion in fixed relation along the elastic member and a member adjustable along said two portions to vary the embracing size of the loop, said adjustable member having an internal configuration defining two holes in side by side relationship, each of the holes receiving one of the two loop portions, one of said holes being of a size so that its walls frictionally grip the portion extending therethrough to hold it in place and the other hole being of a greater size so that its walls are relatively free of the portion extending therethrough whereby only one loop portion is frictionally held and after adjustment the loop is in balanced relation relative to the adjustable member, the other loop portion being free to slide in its hole.

2. A spectacle holder as in claim 1 wherein there is a slot extending between and connecting said two holes.

3. A spectacle holder as in claim 1 wherein there is a slot extending between and connecting said two holes, the size of said slot being less than the size of the elastic member in relaxed condition.

4. A spectacle holder as in claim 1 wherein there is a slot extending between and connecting said two holes, the size of said slot being less than the size of the elastic member in relaxed condition but of a size to permit the elastic member to pass therethrough when in stretched condition.

* * * * *